United States Patent [19]

Antonazzi

[11] Patent Number: 4,570,490
[45] Date of Patent: Feb. 18, 1986

[54] DIFFERENTIAL PRESSURE RATIO MEASUREMENT SYSTEM

[75] Inventor: Frank J. Antonazzi, South Bend, Ind.

[73] Assignee: Allied Corporation, Morristown, N.J.

[21] Appl. No.: 505,142

[22] Filed: Jul. 25, 1983

Related U.S. Application Data

[62] Division of Ser. No. 280,578, Jul. 6, 1981.

[51] Int. Cl.[4] .............................................. G01L 9/12
[52] U.S. Cl. .................................... 73/701; 73/117.4; 73/718
[58] Field of Search ................. 73/701, 718, 724, 729, 73/117.4; 364/431.02; 60/39.27, 39.28 R; 361/283

[56] References Cited

U.S. PATENT DOCUMENTS 4,434,664 3/1984 Antonazzi ............................ 73/701

Primary Examiner—Donald O. Woodiel
Attorney, Agent, or Firm—Ken C. Decker

[57] ABSTRACT

A pressure ratio measuring system is disclosed. The system includes two quartz capacitive pressure transducers (16, 22). Each capsule contains a pressure sensitive capacitor (Csa, Csf) which is fed by an alternating excitation signal. Capacitance (Csa) is fed by excitation signal (Vr) and Capacitance (Csf) is fed out of phase by feedback excitation signal ($-Vr\ f(N)$). The outputs of the capacitance are combined in a summing junction (36) whose output is an error signal (Ie) proportional to the pressure ratio. A feedback loop (26) is closed through a register (30) and a multiplying digital to analog converter (32) to generate the feedback signal ($-Vr\ f(N)$). The feedback loop (26) integrates the error signal (Ie) by incremental changing the feedback signal ($-Vr\ f(N)$) with digital number (N) in a direction to null the loop. When the loop is nulled the digital number (N) is a representation of the ratio (Pa/Pb) of the pressure (Pa) sensed by capacitance (Csf).

4 Claims, 9 Drawing Figures

DIFFERENTIAL PRESSURE RATIO MEASUREMENT SYSTEM

This is a division of application Ser. No. 280,578, filed July 6, 1981.

The invention pertains generally to a pressure ratio measuring system and is more particularly directed to such pressure ratio measuring systems that utilize quartz capacitive pressure transducers in a closed loop system.

In the field of pressure measurement there are many devices known to provide an advantageous transduction of pressure into an electrical signal. These pressure transducer systems generally include a pressure sensitive element that modulates an electrical characteristic of the transducer with respect to changes in pressure. The variances in the electrical characteristic, which for example, may be a resistance, inductance, capacitance, or a similar parameter, are thereafter demodulated by an electrical circuit to generate an electrical signal as a function of the measured pressure.

One particularly advantageous absolute pressure measuring system is described in a co-pending application, U.S. Ser. No. 153,139, now, U.S. Pat. No. 4,322,977 entitled: "Pressure Measuring System" filed on May 27, 1980, in the name of Robert C. Sell, John R. Sheler, and John M. Juhasz. The disclosure of Sell, et al. is hereby incorporated by reference herein.

The reference application discloses a highly accurate pressure measuring system which incorporates a closed loop feedback system and yields a digital output. The previously developed system comprises a pressure sensitive capacitor and a stable reference capacitor, contained within an absolute pressure sensing transducer capsule. The pressure sensitive capacitor and reference capacitor are excited by sinusoidal signals 180° out of phase with each other.

The outputs of the capsule are connected to a summing junction thereby producing a differential signal which is proportional to changes in the measured pressure. The summing junction generates an error signal as the difference of the differential signal and a feedback signal. The error signal is amplified and processed by appropriate filters and an integrator to provide an output which excites a similar feedback transducer capsule connected in a negative feedback loop to another input of the summing junction. The output current from the feedback capsule is utilized to null the error signal or balance the differential signal and is thus a measure of the absolute pressure sensed when the summing junction output is zero.

Additionally, the feedback loop includes a digital counter for the direct measurement of the number of the discrete increments of feedback signal necessary to null the output of the summing junction. The digital readout of the counter is thereby directly proportional to the desired pressure measurement. This system is quite advantageous in the measurement of a single absolute pressure.

Another particularly advantageous pressure measuring system is described in a copending U.S. application Ser. No. 244,184, entitled: "Differential Pressure Measuring System", filed on Mar. 16, 1981, in the names of Frank J. Antonazzi, and Joseph A. Bluish. The disclosure of Antonazzi, et al. is hereby incorporated by reference herein.

The Antonazzi, et al. application includes a pressure sensitive input impedance configuration that generates a current proportional to a differential pressure. A closed loop feedback system similar to that disclosed in the Sell, et al. application is used to null an error signal formed as the difference between the input signal and a feedback signal. The Antonazzi, et al. system then converts the error signal into a digital number N, proportional to the differential pressure measured.

There are, however, many instances in which a pressure ratio is desired to be measured. Different pressure ratios are particularly useful in the control of gas turbine engines for aircraft or other uses. Pressure ratios are needed to calculate important parameters such as engine pressure ratio (EPR) and Mach number. The engine pressure ratio for a gas turbine engine can be calculated as the ratio of the exhaust pressure of the engine over the total inlet pressure. A useful ratio for determining Mach number is the difference of the total inlet pressure and static inlet pressure over the total inlet pressure. After formation these variables can be used to control fuel flow and thus engine power.

To provide an indication of EPR or Mach number in the past a dual channel absolute pressure measuring system has been used. After each pressure has been measured, the ratio is calculated by dividing one measured value by the other. This technique is not optimum, as it creates a great burden on the accuracy of each absolute pressure measuring system. If the ratio is very close to one, small errors of the oppposite sign in the measurement of either the numerator or denominator values can introduce larger errors in the resulting ratio. Likewise, for very large or small ratio values, where the components are quite different in size, the errors in a component are magnified in the resulting ratio.

Therefore, it would be highly desirable to generate a parameter representative of a pressure ratio or a differential ratio with an accurate closed loop measurement system such as those described in Antonazzi, et al., or Sell, et al., but prior to the introduction of any substantial error in the measurement.

SUMMARY OF THE INVENTION

The invention is a pressure ratio measuring system including a first quartz capacitive capsule having a pressure sensitive capacitor for measuring the change in one absolute pressure, an alternating source of excitation voltage feeding the first quartz capsule, means for summing the output of the first capsule and a feedback signal; means for generating the feedback signal which includes means for generating the time integral of the difference between the output of the first capsule and the feedback signal, means for multiplying the output of the integral generating means times a second excitation signal, 180° out of phase with said excitation source, and a second quartz capsule fed by said second excitation signal and having a pressure sensitive capacitor for measuring the change in a second absolute pressure whose output generates the feedback signal; and means for counting the number of increments N of feedback signal necessary to null the output of the first capsule.

The number of increments N to null the error signal is proportional to the ratio of the first pressure to the second pressure. Since a signal indicative of the pressure ratio has been formed by the two capsules as the output of the summing junction, substantially no calculation error is introduced in the measurement at this point. Thereafter, this single error signal can be converted into a ratio measurement with a very high degree of accuracy. If one pressure is the engine total inlet pressure and the other is the engine exhaust pressure, then the parameter EPR can be calculated directly.

In a second preferred implementation of the invention, a third quartz capsule containing a pressure sensitive capacitor for measuring the change in the second absolute pressure is provided. The third capsule is fed by an excitation 180° out of phase with the first excitation and has its output connected to the summing junction. Alternatively, the pressure sensitive capacitances of the second and third capsules can be contained in one quartz capsule.

In this configuration, an error signal representative of a differential ratio is formed where the difference between the first and second pressures is divided by the second pressure. The error signal is converted into a number N proportional to the differential ratio by the means for generating of a feedback signal and the counting means. If the first pressure is total inlet pressure and the second pressure is static inlet pressure, then the differential ratio formed is directly proportional to Mach number.

These and other objects, features, and aspects of the invention will be more clearly understood and better described if a reading of the detailed description is undertaken in conjunction with the appended drawings, wherein:

DETAILED DESCRIPTION OF THE PREFERRED EMBODIMENTS OF THE INVENTION

Figure 1:
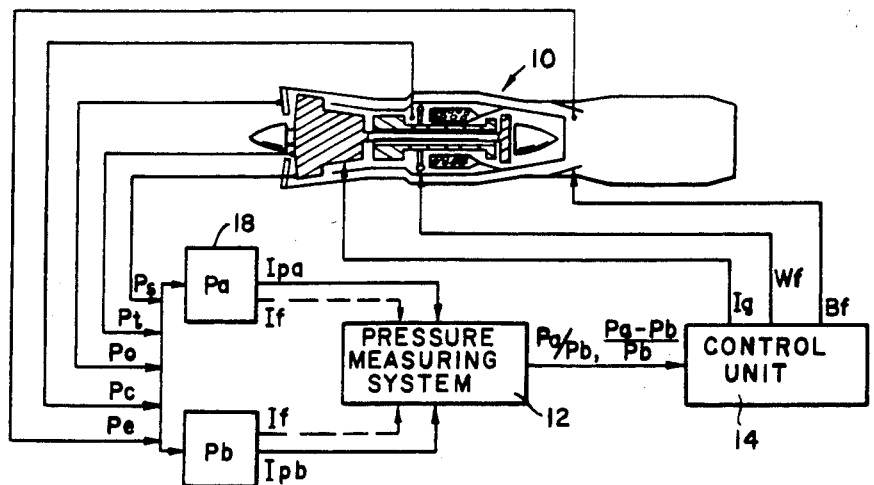
FIG. 1 is a system block diagram of a control system for a gas turbine engine which utilizes a pressure ratio measurement system constructed in accordance with the invention.

With respect now to FIG. 1, there is illustrated a conventional gas turbine engine 10 of the turbo fan type. The engine 10 comprises two compressors of the axial type which are powered by a set of attached turbines. The turbines are rotated by burning a fuel/air mixture in a combustion chamber which is output from the compressors and a fuel ring. In this type of reaction engine the energy not expended in driving the turbines is exhausted from a nozzle to produce a thrust. Additionally, a portion of the air drawn in by the low pressure compressor is diverted around the combustion section for mixture with the exhaust gases before reaching the nozzle.

Typically, there are a number of pressures to be measured that are useful in controlling this type of engine. The pressures include the ambient pressure Po, the total inlet pressure Pt, the inlet static pressure Ps, the exhaust pressure Pe, and the compressor pressure Pc. The typical stations where these pressures are available on the engines have been illustrated at various points on the engine 10. It is known in the art that other pressures can be advantageously used in controlling a gas turbine engine and those illustrated have been shown only for exemplary purposes.

The invention is a pressure ratio measuring system 12 which generates an electrical signal to a generalized control unit 14 which is either the ratio of the pressures of a chamber 18 and a chamber 20 or the ratio of a pressure difference divided by one of the pressure terms. Thus, either the ratios Pa/Pb or Pb/Pa can be calculated by a first embodiment of the invention or the differential ratios Pa−Pb/Pb, Pa−Pb/Pa, Pb−Pa/Pa, or Pb−Pa/Pb can be calculated by a second embodiment of the invention.

Any of the aforementioned pressures can be communicated by suitable conduits to either of the chamber 18 and 20. Consequently, many desirable engine control parameters can be calculated directly for input to the control unit 14. For example, if the pressure Pe is communicated to chamber 18 and Pt is communicated to chamber 20, then the ratio Pa/Pb will be representative of engine pressure ratio (EPR). Alternatively, if the pressure Pt is communicated to the chamber 18 and Ps is communicated to the chamber 20, then the differential ratio Pa−Pb/Pa will be proportional to Mach number. These engine control variables are subsequently transmitted to the control unit 14 where they are operated on by generalized control laws to generate signals Ig indicative of the position of the inlet guide vanes of the low pressure compressor, Wf indicative of the fuel flow to the engine, and Bf indicative of the position of the bypass flow nozzle. As known, many other engine control variables can be generated by a control unit in this manner.

The first embodiment of the pressure ratio measurement system constructed in accordance with the teachings of the invention will now be more fully described with reference to FIG. 2. The system includes an alternating frequency generator 24 which generates alternating excitation signals Vr, −Vr at a certain frequency and amplitude. The excitation signals Vr, −Vr are preferably of the same amplitude and frequency but of opposite phase. These signals could, for example, be generated by a sinusoidal generator connected to the primary of a transformer having a secondary winding with a grounded center tap. In this configuration, Vr would be generated between one pole of the secondary winding and the center tap and −Vr would be generated between the other pole of the second winding and the center tap.

The excitation signals feed a first pressure sensing capsule 16 and a second pressure sensing capsule 22. Pressure capsule 16 comprises a pressure sensitive capacitance Csa and similarly, pressure sensing capsule 22 comprises a pressure sensitive capacitance Csf. Preferably, each capsule 16, 22 is a quartz capacitive transducer as will be more fully described hereinafter. Each of the pressure capsules 16 and 22 are mounted in the separate pressure chambers 18 and 20 of the system which communicate to pressures Pa and Pb, respectively. Conventional mounting techniques are utilized for exposing the capsules to the pressures in chambers 18 and 20.

The pressure sensitive capacitor Csa when fed by the excitation Vr develops a current Ipa proportional to its capacitance. When Csa changes with variances in pressure, the current Ipa will be generated proportional to the change in pressure Pa. Similarly, the pressure sensitive capacitor Csf when fed by a feedback excitation −Vr f(N) develops a feedback current If proportional to its capacitance. As with the previous capsule, the feedback current If is proportional to the change in the capacitance Csf and thus, proportional to the changes in pressure Pb to be measured in chamber 20.

The currents Ipa, If are subsequently combined in a summing junction 36. However, since the pressure sensitive capacitor Csa is fed 180° out of phase with the pressure sensitive capacitor Csf the output of the summing junction 22 will be an error current Ie which is the difference Ipa−If. The error current Ie is transmitted to a feedback loop 26 which integrates the error and converts it into a digital number, N. For assistance in the demodulation of the error current Ie, the feedback loop further inputs the reference excitation Vr.

The digital number, N, is fed back to a register 30 where it controls the gain of a multiplying digital to analog converter (MDAC) 32. The digital number is transferred to the register 30 under the control of the feedback loop by means of a sequencer signals. Another input to the MDAC 32 is the reference excitation −Vr. The MDAC generates a signal −Vr f(N) which is of the same frequency and phase as the excitation −Vr but with an amplitude which varies as a function of the digital number N. The pressure sensitive capacitance Csf is excited by the signal −Vr f(N) to generate the feedback current If.

In operation, as will be more fully explained hereinafter, the error current Ie is integrated to zero by the feedback loop 26. The integration is accomplished by incrementing or decrementing the digital number N and hence the feedback signal until the error current Ie is zero. At that time, the current Ipa equals the feedback current If and the digital number N is proportional to the ratio Pa/Pb. The digital number N is then calibrated for temperature by the feedback loop 26 which receives a temperature signal T from a temperature sensor 28. The temperature signal T is representative of the ambient temperature as sensed by the sensor 28 at a location proximate to the pressure sensors 16, 22. After calibration, the measured parameter Pa/Pb is output to the control unit 14.

Since the system in the steady state is essentially configured as an operational amplifier (pure amplifier with an infinite gain) the system transfer function for the digital output N can be envisioned as substantially equivalent to:

$$N = Xf/Xm\ Nmax$$

where Xf is the reactance of the feedback loop, Xm is the reactance of the pressure measuring input, and Nmax is the maximum digital number output from the system. In the first embodiment, then:

$$Xf = 1/(2\pi f)Csf$$

$$Xm = 1/(2\pi f)Csa$$

therefore:

$$N = Csa/Csf\ Nmax$$

since Csa varies with Pa; Csf varies with Pb; then N is proportional to:

$$Pa/Pb\ Nmax$$

Thus, it has been shown how to calculate the ratio Pa/Pb from the system illustrated. For the calculation of Pb/Pa it is evident that the pressure capsules 16, 22 can be reversed in their positioning where capsule 16 is located in chamber 20 and capsule 22 is located in chamber 18.

Figure 4:
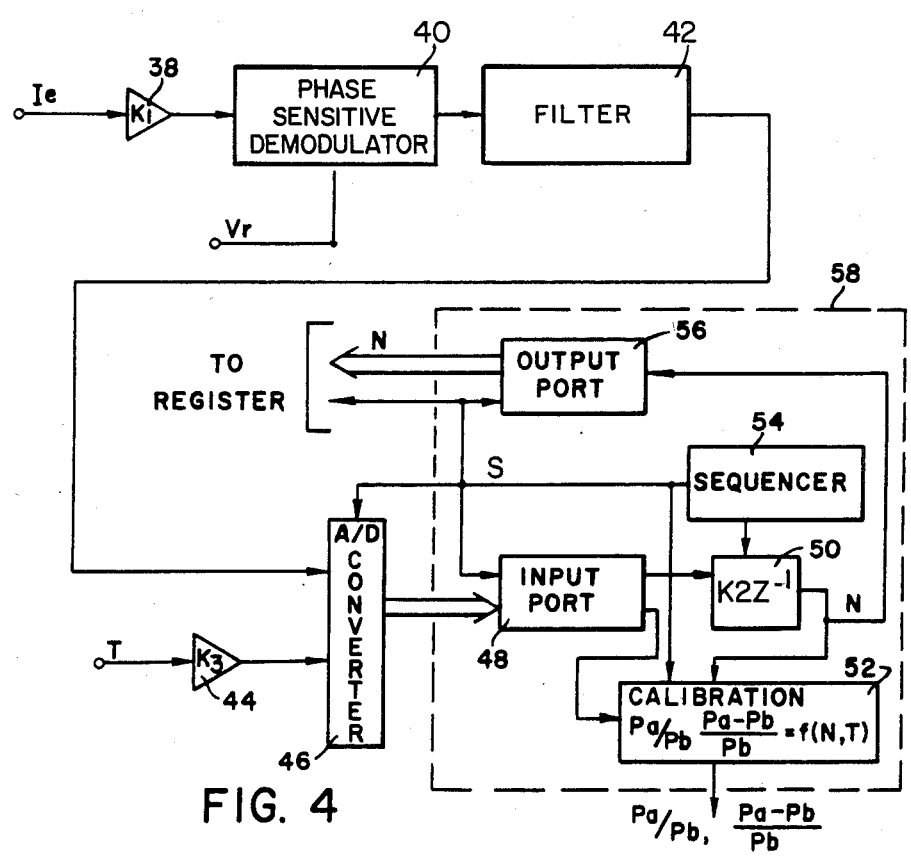
FIG. 4 is a detailed block diagrammatic view of the feedback loop of the pressure ratio measurement systems shown in FIGS. 2 and 3.

The conversion of the error current Ie into a digital number N is obtained by closing a loop around the summing junction 36 and calculating the amount of feedback curent If that will be necessary to null or balance the error current. The resolution in the system in the digital domain is made by incrementally varying the feedback current If and counting the number of increments necessary for balance to determine the pressure ratio. This conversion will now be more fully explained with reference to FIGS. 4 and 9.

To accomplish the conversion, the error current Ie is transmitted from the summing junction to a current-to-voltage amplifier 38 where it is multiplied by a gain K1. The amplitude of the alternating voltage, representing the magnitude of the error is thereafter fed to a phase sensitive demodulator 40 which additionally has an input reference signal Vr from the generator 24. The error voltage output from amplifier 38 is demodulated by circuit 40 into a DC voltage with an amplitude proportional to the error signal. The DC voltage is transmitted through a filter circuit 42 and is thereafter input to one port of a multiplexing analog to digital (A/D) converter 46. Another input for a second port of the A/D converter 46 is a temperature signal T from the temperature sensor 28. The temperature signal T is transmitted to the A/D converter 46 after amplification by amplifier 44 having a gain of K3.

The A/D converter 46 transforms the analog signals input to its ports into digital numbers to be input to a digital processor, preferably a microprocessor, illustrated as block 58. The processor 58 could be included as part of the control unit 14 or be a separate element. The digital numbers are input to the processor 58 through an input port 48 under the control of a sequencer 54 having a sequencer control signal S.

The two digital signals representative of error and temperature are necessary to determine the pressure ratio by a calibration mapping routine as will be more fully described hereinafter. The digital form of the error signal contains information as to the sign and magnitude of the error signal. The sign of the error indicates the direction in which the feedback current If must be changed to balance the system while the magnitude of the error informs the system of the amount the feedback current must change to be in balance. This digital error signal can be any bit length required for the designed resolution of the system. The digital form of the temperature signal is generally of any required bit size and contains information as to the magnitude of the ambient temperature.

The input port 48 further communicates with a digital integrator 50 with an integral gain of K2. The integrator 50 can be implemented as an internal processor register with the integration rate being the size and frequency of its incrementation. Additionally, the input port 40 transmits a digital input T to a calibration mapping routine 52. The output of the digital integrator 50, which is a digital number N, is fed back to the summing junction 36 through an output port 56 under supervision of the sequencer 54 to the resistor 30. The sequencer 54, internal to the microprocessor as either hardware or software communicates by means of sequencer signal S with the input port 48, output port 56, A/D converter 46, integrator 50, calibration mapping routine 52, and register 31, to synchronize the process of inputting and outputting the digital numbers.

Figure 9:
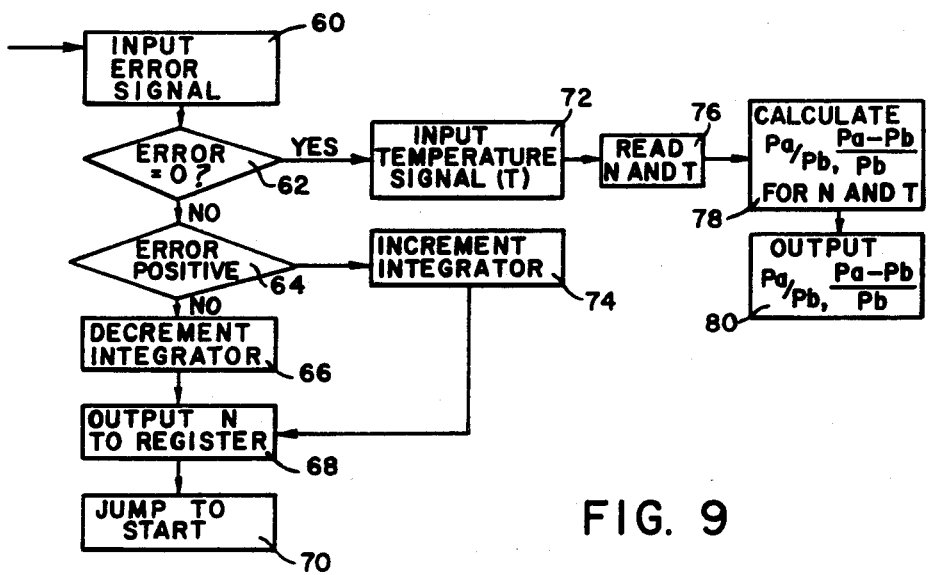
FIG. 9 is a pictorial representation of a system flow chart of the steps utilized in the feedback loop of the system for the embodiments illustrated in FIGS. 2 and 3.

The flow chart illustrated in FIG. 9 will now be used to further describe the conversion of the error signal into a digital number N. This flow chart represents the functional steps in a program stored in sequencer 54 for converting the measured pressure ratios into the digital number N. The program can be part of a major fuel control program where it is called as a subroutine or a separate stand alone block where the result is output directly to control unit 14.

The sequence of process steps begins by inputting the error signal as defined by block 60. This is accomplished by signaling the A/D converter 46 that the DC error signal from filter circuit 42 should be converted to a digital number. After the conversion, the output of the A/D converter is transferred to a register internal to the processor 58 for storage by means of the input port 48.

The error signal which has a magnitude and sign is thereafter tested during process steps 62 and 64. The error signal is first tested in block 62 to determine if its magnitude is equal to zero. If nonzero, then the digital number N is not yet indicative of the error signal and the loop has not settled. Therefore, an indication of which direction to increment the number N must be found.

The test accomplished in block 64 provides this indication. If the error signal is positive, then the error current Ie is larger than the feedback current If and integrator 50 is incremented by step 74 to increase the feedback current. If the error signal is negative, then the error current Ie is less than the feedback current If and integrator 50 is decremented by step 66 to decrease the feedback current.

After either step 66 or 74 is finished, the new digital number N will be output to register 30 through the output port 56 during step 68. The number N is thereafter fed back to vary the error current in a direction to null the loop through the MDAC 32 and feedback capsule. This process is continued by jumping to block 60 from block 70 after the number N is output.

The integration rate for integrator 50 will be a function of the program execution time and the size of the increment added to the integral sum after stored each pass. The sequencer can be made to change either of these parameters and thus make the integration rate variable. A variable integration rate would be advantageous, for example, when it was desired that the settlement time of the loop be improved. In such a case, as taught by Sell et al., the integration rate would be increased for large error currents and reduced for small error currents near the balance point.

The program will continue to vary the feedback current by increments in this manner until the error current is nulled. When this occurs, the sequence will flow from the test in block 62 to block 72. At this time the sequencer 54 will signal A/D converter 46 to convert the output of the temperature sensor 28 into a digital number. The temperature signal T in digital form will then be input through the input port 48 and stored. This step in the sequence is illustrated as block 72. The system will now begin a calibration cycle where the stored values of N and T are read during step 76 and the corresponding pressure ratio value found from a calculation accomplished by block 78.

The calculation step can be accomplished by one of two alternative methods. In the first, a look-up table of the values of the number N, pressure ratio, Pa/Pb or Pb/Pa, and temperature T is composed empirically. An initial calibration is formed by exposing the system to a matrix of known pressure ratios and temperatures and recording the digital number N produced for each point. Each point is placed in a memory element such as a read only memory (ROM) to form the look-up table. The look-up table may then be used to find the pressure ratios which corresponds to the measured values for N and T during the gas turbine engine operation. If necessary an interpolation routine can be used to find the pressure ratios between two empirical points.

An alternate method is to derive, from the calibration data for known pressure ratios and temperatures, an equation for the pressure ratio as a function of the variables N and T. Then to obtain an indication of an unknown pressure ratio, this equation can be executed in the software loop to convert the measured parameters N and T to a representation of the unknown pressure ratio. The pressure ratio is thereafter output during step 80 to be directly used by control unit 14 or for use in a larger program or processor.

While a digital software implementation of the feedback loop has been described for indicating the preferred embodiment of the invention, it will be obvious to one skilled in the art that the feedback circuitry illustrated in the referenced Sell et al. application could just as easily be used. In such an instance, the feedback circuitry illustrated in FIG. 4 of that application as elements 14, 16, 26, and 28, could be readily substituted for the digital loop to take the error current Ie and convert it into a feedback signal $-Vr\ f(N)$. Moreover, the system loop could also be implemented in a totally analog configuration. In that case the loop would include analog amplification, demodulation, and integration to output an analog output signal representative of the pressure ratio. The feedback loop would utilize an analog multiplier controlled by the output signal to null the loop.

Figure 3:
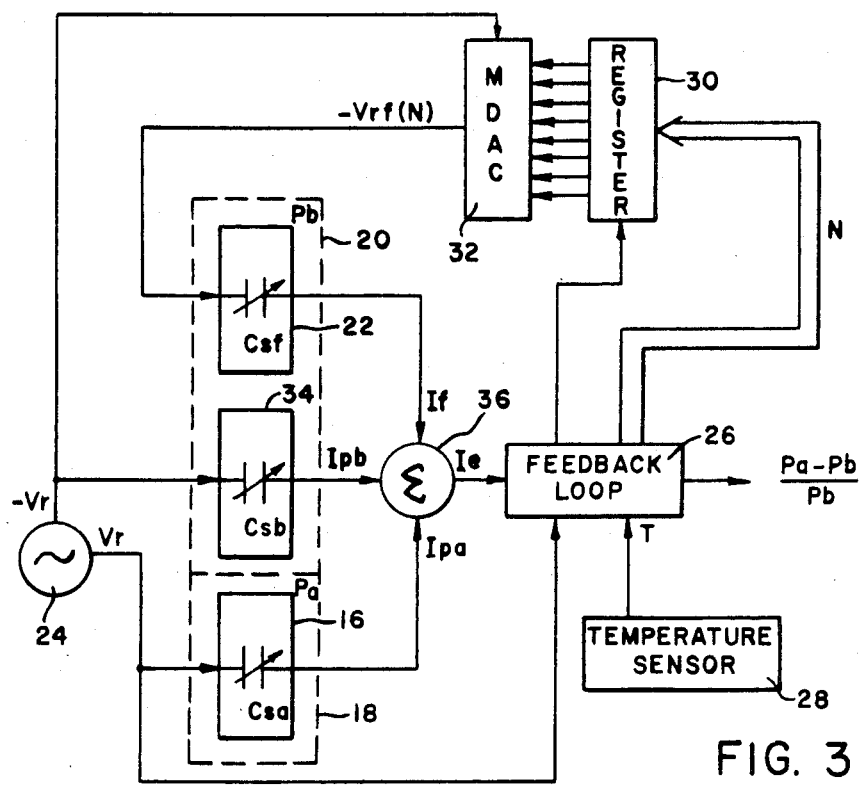
FIG. 3 is an electrical schematic view in block diagram form of a second embodiment of the pressure ratio measurement system illustrated in FIG. 1 wherein a differential pressure is ratioed to one of the components of the differential.

In a second preferred embodiment of the invention, illustrated in FIG. 3, another quartz pressure transducer capsule 34 has been positioned in the pressure chamber 20. The capsule 34 includes a pressure sensitive capacitance Csb which is fed by the excitation $-Vr$. The current Ipb generated by the capacitance with this excitation is proportional to the variances in pressure Pb but of an opposite phase to current Ipa. The other elements of the pressure measuring system are unchanged and thus, like numerals for identical elements in both embodiments have been retained.

The third capsule 34 is placed in one of the pressure chambers 18 or 20 to provide another pressure variable term in the numerator of the system transfer function which is differenced with the term Csa. In the implementation illustrated, the capsule 34 is placed in the pressure chamber 20. In this manner, the summing junction 36 will combine the difference Ipa—Ipb with the feedback current If to generate the error current Ie. The difference Ipa—Ipb is proportional to the difference in pressures Pa—Pb.

Therefore, the transfer function of the system as previously indicated is:

$$N = Xf/Xm \; Nmax$$

where Xf is the reactance of the feedback loop and is equal to:

$$1/(2\pi f)Cfs,$$

and where Xm is the reactance of the measuring input and is equal to:

$$1/(2\pi f)(Csa-Csb)$$

which reduces to:
$$N = (Csa-Csb)/Cfs \; Nmax$$

Since Csa varies with Pa; and Csb, Csf vary with Pb; then N is proportional to:

$$Pa-Pb/Pb \; Nmax$$

Figure 2:
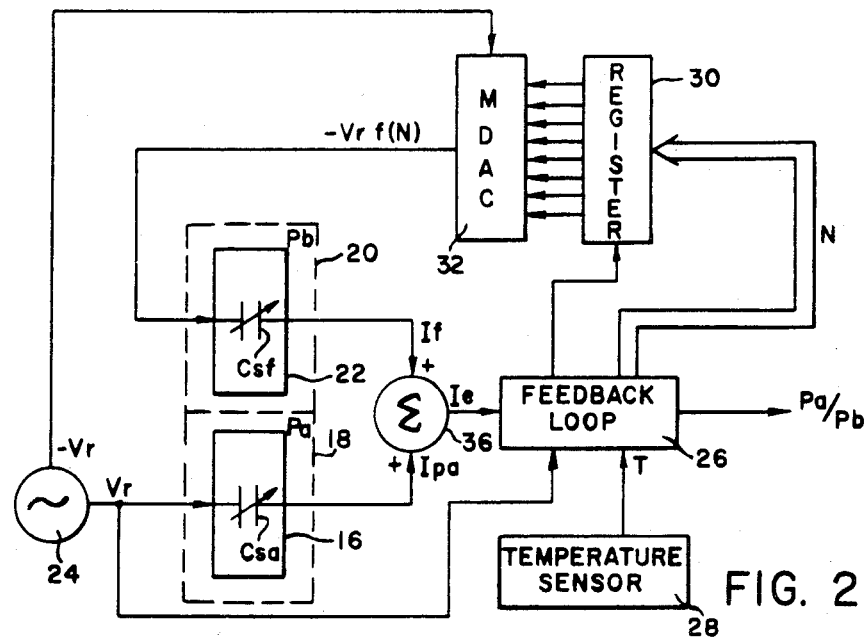
FIG. 2 is an electrical schematic view in block diagram form of the pressure ratio measurement system as illustrated in FIG. 1.

In operation, the embodiment shown in FIG. 3 measures the differential pressue ratio in the same manner as the system illustrated in FIG. 2. Specifically, the feedback current If is incremented, in one direction or the other, until the error current Ie is forced to a null value. At that time the temperature signal T and the digital number N are communicated to a calibration routine. A look-up table or ROM where values of Pa—Pb/Pb have been stored is interrogated with respct to the measured number N and temperature T to yield the final differential pressue ratio.

Thus, it has been shown how to calculate the differential ratio Pa—Pb/Pb from the system illustrated in FIG. 3. From the previous discussion it is evident that the other differential ratios Pb—Pa/Pa, Pb—Pa/Pb, and Pa—Pb/Pa can further be calculated in a like manner. The differential ratio Pa—Pb/Pa can be most easily calculated by placing capsule 22 in the pressure chamber 18 instead of pressure chamber 20. The differential ratio Pb—Pa/Pa is generated if the excitation Vr is fed to capsule 34 and the excitation —Vr is fed to capsule 16. Finally, the differential ratio Pb—Pa/Pa is generated if the excitation Vr is fed to capsule 34, the excitation —Vr is fed to capsule 16, and the capsule 22 is placed in pressure chamber 18 instead of pressure chamber 20.

Figure 5:
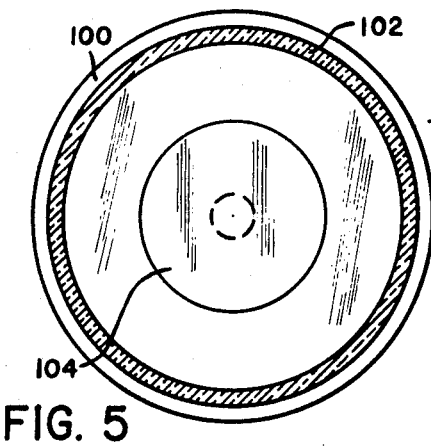
FIG. 5 is a cross-sectional top view of a quartz capacitive pressure capsule as utilized in the embodiments of the invention illustrated in FIGS. 2 and 3.
Figure 6:
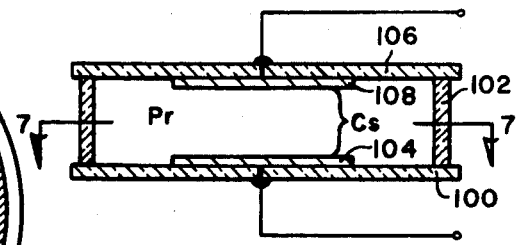
FIGS. 6 and 7 are cross sectional side views of the capsule illustrated in FIG. 5 in an unpressurized and pressurized state, respectively.
Figure 7:
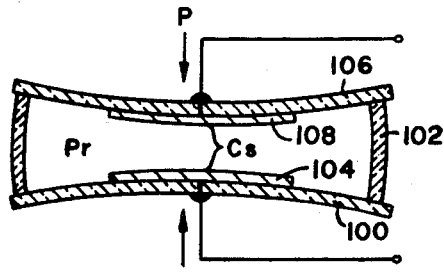

FIGS. 5, 6, and 7, illustrate the preferred implementation of the quartz capacitive capsules which are schematically shown in FIGS. 2 and 3 as elements 16, 22, and 34. Each transducer comprises two relatively flat opposing discs 100, 106, of quartz or a similar vitreous material with similar temperature and flexion characteristics. Quartz is preferable because its deflection characteristic with respect to pressure is relatively large, while changes in that characteristic with respect to temperature are relatively insignificant.

On the inner face of each disc, for example, disc 100, there is formed a capacitor plate 104 of some conductive material by a screening or vapor deposition process or the like. Preferably, the plate is comprised of a noble metal such as copper, gold, silver, or a similar material. Plate 104 is circular in shape and substantially centrally located on the disc. After formation of the plate 104 and formation of a similar plate 108 on disc 106, the discs are joined by an annular frit 102 along their peripheral edge to form a gap between them. The frit 102 is of an insulating material and the interior of the transducer is evacuated or set at a reference pressure Pr.

Figure 8:
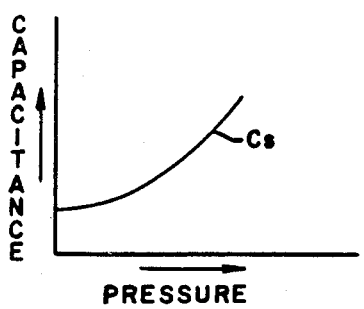
FIG. 8 is a graphical representation of the capacitance change as a function of pressure for the capsule illustrated in FIGS. 5, 6, and 7.

As is seen in FIG. 7, a change in outside pressure P will cause a deformation of the discs 100, 106 and vary the gap distance between the quartz discs. This flexion varies the distance between capacitor plates 108 and 104 and thus varies the capacitance of the pressure variable capacitor Cs formed of those plates. This operation results from the fact that the central portions of the discs are easily deflectable while the portions adjacent the edges are relatively nondeflectable. The generalized response of the transducer capsule for a change in capacitance due to a change in pressure is illustrated in FIG. 8. A capacitive pressure transduccer of this type is more fully disclosed in a commonly assigned U.S. Pat. No. 3,858,097 issued to Polye, the disclosure of which is hereby expressly incorporated by reference herein.

While a detailed description of the preferred embodiments has been disclosed, it will be obvious to those skilled in the art that various modifications and changes may be made thereto without departing from the scope and spirit of the invention as hereinafter defined in the appended claims.

What is claimed is:

1. A differential pressure ratio measuring system comprising:
   means for generating first and second alternating reference signals having a predetermined phase relationship therebetween;
   a first pressure sensitive impedance; responsive to a first pressure and driven by said first reference signal, for generating a first signal proportional to the change in said first pressure;
   a second pressure sensitive impedance, responsive to a second pressure and driven by an alternating feedback signal, for generating a second signal proportional to the change in the second pressure;
   a third pressure sensitive impedance, responsive to at least one of said first and second pressures and driven by said second reference signal, for generating a third signal proportional to at least one of said first and second pressures;
   means, electrically connected to said first, second, and third impedances, for generating an error signal as the combination of said first, second, and third signal; and
   means for converting said error signal into a digital number including means for integrating said error signal and generating a digital output number therefrom representative of the ratio of the difference of said first and second pressure to the first pressure, digital-to-analog converter means for converting said digital number to an analog signal, and means for multiplying said analog signal by said second reference signal to generate said feedback signal, wherein said feedback signal is fed to said second impedance means to generate said second signal and null said error signal.

2. A differential pressure ratio measuring system as defined in claim 1, wherein:

said first, second, and third impedances are capacitances.

3. A differential pressure ratio measuring system as defined in claim 2, wherein said digital number during steady state conditions is proportional to:

$$C_{sa} - C_{sb}/C_{sf}\, N_{max}$$

where $C_{sa}$, $C_{sf}$, $C_{sb}$ are said first, second, and third pressure sensitive impedances, respectively and $N_{max}$ is the maximum digital value for the digital number.

4. A differential pressure ratio measuring system as defined in claim 3, wherein:
said first pressure is the total inlet pressure of a gas turbine engine; and said second pressure is the inlet static pressure of a gas turbine engine; whereby said digital output number N is proportional to the Mach number the engine is experiencing.

* * * * *